(12) United States Patent
La Haye et al.

(10) Patent No.: US 6,170,952 B1
(45) Date of Patent: Jan. 9, 2001

(54) ADHERENT CORRECTIVE LENSES AND EYEGLASSES EMBODYING THE SAME

(75) Inventors: Peter G. La Haye, Medina; Dennis L. Burns, Issaquah; Charles A. Bernheiser, Maple Valley, all of WA (US)

(73) Assignee: Neoptx, Inc., Redmond, WA (US)

( * ) Notice: Under 35 U.S.C. 154(b), the term of this patent shall be extended for 0 days.

(21) Appl. No.: 09/200,420

(22) Filed: Nov. 23, 1998

(Under 37 CFR 1.47)

Related U.S. Application Data

(63) Continuation-in-part of application No. 08/484,265, filed on Jun. 7, 1995, now abandoned, which is a continuation of application No. 08/198,183, filed on Feb. 17, 1994, now Pat. No. 5,478,824, and a continuation-in-part of application No. 08/163,678, filed on Dec. 7, 1993, now abandoned.

(51) Int. Cl.[7] .................. G02C 7/06; G02C 7/08
(52) U.S. Cl. .................. 351/168; 351/172; 351/177
(58) Field of Search .................. 351/168, 169, 351/170, 171, 172, 177

(56) References Cited

U.S. PATENT DOCUMENTS

| 1,750,731 | 3/1930 | Smith . |
| 1,751,425 | 3/1930 | Smith . |
| 1,981,439 | 11/1934 | Smith . |
| 1,996,086 | 4/1935 | Styll . |
| 2,511,329 | 6/1950 | Craig . |
| 3,033,359 | 5/1962 | Mercer . |

(List continued on next page.)

FOREIGN PATENT DOCUMENTS

| 0 329 389 | 8/1989 | (EP) . |
| 0 341 998 | 11/1989 | (EP) . |
| 1362595 | 4/1964 | (FR) . |
| 1538221 | 7/1968 | (FR) . |
| 2 689 654 | 10/1993 | (FR) . |
| 1100148 | 1/1968 | (GB) . |

OTHER PUBLICATIONS

Elmstrom, George P., O.D., "Evaluating What's New," *Journal of American Optometric Association*, 43(7):795 (1972).

American Optical Company, "Lenticular Lenses," *Lens Prescription Catalog*, p. 14 (1935).

Unilens Corp., USA, "A New Low Vision Alternative," [marketing pamphlet?] *UniVision Low Vision Lens* (1993).

* cited by examiner

*Primary Examiner*—Scott J. Sugarman
(74) *Attorney, Agent, or Firm*—Christensen O'Connor Johnson Kindness PLLC

(57) ABSTRACT

The present invention is directed to a magnifying and/or corrective lens or optical element that may be removably adhered to a plano lens, such as the pane of a of a pair of spectacles or sunglasses, without the use of a mechanical retention device or other mechanical means for retention. The lenses are injection-molded from an aliphatic thermoplastic polyurethane, and capable of conforming to a variety of surface shapes and of adhering via tactile interactions to a plano lens without the use of an adhesive. The lenses may be securely but releasably secured to the surface of a plano lens by finger pressure alone due to their inherent molecular surface-adhesion characteristics to readily create magnifying or corrective lenses, or to modify the magnification or correction of a pair of sunglasses or plano eyeglasses. The lens of the present invention has at least one curved surface and a refractive index such that the curved surface and the refractive index cooperatively produce a nominal magnifying power. The present invention is also directed to a pair of spectacles that comprise a magnifying and/or corrective lens securely adhered to a pane of a pair of spectacles without the use of a mechanical retention device.

27 Claims, 3 Drawing Sheets

U.S. PATENT DOCUMENTS

| | | |
|---|---|---|
| 3,195,145 | 7/1965 | Tisher et al. . |
| 3,228,696 | 1/1966 | Hull . |
| 3,413,057 | 11/1968 | Carmichael . |
| 3,628,854 | 12/1971 | Jampolsky . |
| 3,685,889 | 8/1972 | Thatcher . |
| 3,689,136 | 9/1972 | Atamian . |
| 3,771,858 | 11/1973 | Bivens . |
| 3,890,037 | 6/1975 | Zingarelli . |
| 3,904,281 | 9/1975 | Jampolsky . |
| 4,018,515 | 4/1977 | Derkas . |
| 4,070,103 | 1/1978 | Meeker . |
| 4,079,160 | 3/1978 | Philipson . |
| 4,091,057 | 5/1978 | Weber . |
| 4,196,978 | 4/1980 | Johnson . |
| 4,247,178 | 1/1981 | Cook . |
| 4,304,469 | 12/1981 | Solomon . |
| 4,357,080 | 11/1982 | Solomon . |
| 4,451,127 | 5/1984 | Moffit, Jr. . |
| 4,534,627 | 8/1985 | Vosper . |
| 4,540,534 | 9/1985 | Grendol . |
| 4,547,049 | 10/1985 | Cotie . |
| 4,563,065 | 1/1986 | Kreissl . |
| 4,576,850 | 3/1986 | Martens . |
| 4,582,885 | 4/1986 | Barber . |
| 4,645,317 | 2/1987 | Frieder et al. . |
| 4,664,854 | 5/1987 | Bakalar . |
| 4,668,558 | 5/1987 | Barber . |
| 4,729,650 | 3/1988 | Jennings . |
| 4,730,915 | 3/1988 | Jannard . |
| 4,740,069 | 4/1988 | Baum . |
| 4,824,233 | 4/1989 | Jannard . |
| 4,828,769 | 5/1989 | Maus et al. . |
| 4,836,960 | 6/1989 | Spector et al. . |
| 4,849,151 | 7/1989 | Tamura et al. . |
| 4,859,048 | 8/1989 | Jannard . |
| 4,867,550 | 9/1989 | Jannard . |
| 4,892,403 | 1/1990 | Merle . |
| 4,900,242 | 2/1990 | Maus et al. . |
| 4,938,580 | 7/1990 | Stang . |
| 4,943,152 | 7/1990 | Whelen . |
| 4,976,530 | 12/1990 | Mackay et al. . |
| 5,005,214 | 4/1991 | Koethe . |
| 5,007,727 | 4/1991 | Kahaney et al. . |
| 5,017,001 | 5/1991 | Kooketsu . |
| 5,037,193 | 8/1991 | Funk . |
| 5,056,906 | 10/1991 | Akiyoshi . |
| 5,093,049 | 3/1992 | Uehara et al. . |
| 5,106,178 | 4/1992 | Akiyoshi . |
| 5,108,689 | 4/1992 | Uehara et al. . |
| 5,153,619 | 10/1992 | Nix . |
| 5,164,749 | 11/1992 | Shelton . |
| 5,175,571 | 12/1992 | Tanefsky et al. . |
| 5,182,586 | 1/1993 | Bennato . |
| 5,243,366 | 9/1993 | Blevins . |
| 5,266,977 | 11/1993 | Linden . |
| 5,349,393 | 9/1994 | Kreft . |
| 5,399,303 | 3/1995 | Yamaguchi et al. . |
| 5,677,751 | 10/1997 | Gerber . |
| 5,764,333 * | 6/1998 | Somsel ................................. 351/47 |
| 5,793,467 | 8/1998 | Bailey . |
| 6,027,214 * | 2/2000 | Graham ................................. 351/41 |

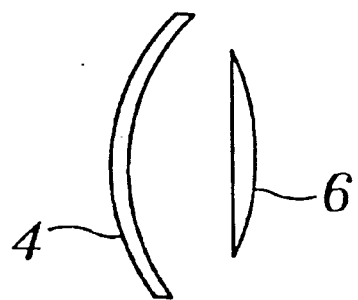
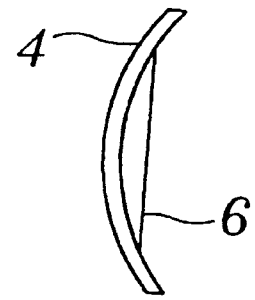
FIG. 9a            FIG. 9b
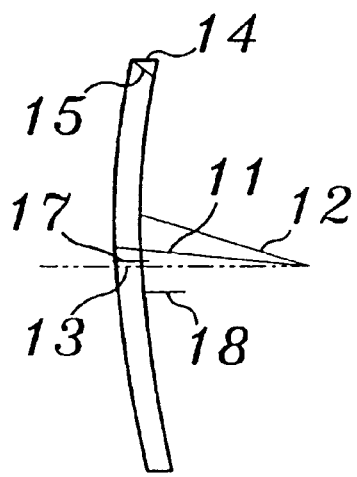
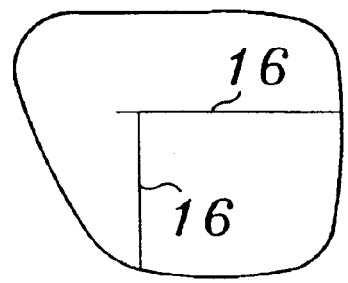
FIG. 10a           FIG. 10b

ADHERENT CORRECTIVE LENSES AND EYEGLASSES EMBODYING THE SAME

RELATED APPLICATIONS

The present application is a C-I-P of U.S. patent application Ser. No. 08/163,678, filed on Dec. 7, 1993 now abandoned, and a C-I-P of U.S. patent application Ser. No. 08/484,265, filed on Jun. 7, 1995 now abandoned, which is a continuation of U.S. patent application Ser. No. 08/198,183, filed on Feb. 17, 1994, now U.S. Pat. No. 5,478,824, issued on Dec. 26, 1995.

FIELD OF THE INVENTION

The present invention is directed to corrective lenses for use with spectacles, such as eyeglasses or sunglasses. The corrective lenses of the present invention include magnifying lenses, as well as lenses for correction of other types of vision deficiencies. Specifically, the present invention is directed to injection-molded elastomeric (such as aliphatic polyurethane) press-on lenses and eyeglasses or spectacles embodying the same, wherein the lenses are of optical clarity and can be adhered to sunglasses, safety glasses, sports goggles, eyeglasses or other plano lenses by virtue of their autogenous adhesive properties, that is, adherence between the sunglass or other plano lenses and the lenses of the present invention is effected by molecular surface adhesion between the lenses of the invention and the sunglass or other plano lens to which it is adhered, without the use of mechanical means for retaining the corrective lens on the surface of the base lens.

BACKGROUND OF THE INVENTION

Many people require more than one pair of corrective eyeglasses, depending on the circumstances they find themselves in. For example, many middle aged people are far-sighted. This means that they have little difficulty seeing objects at a distance, but have considerable difficulty seeing objects up close. These individuals have difficulty seeing print in a book clearly enough to read, so they need some sort of corrective lenses or magnifying glass in order to read. When such an individual is outside in the sun and wearing sunglasses, a practical problem arises if that individual wishes to read a book: he or she must purchase a pair of prescription sunglasses or endure the sun without the benefit of sunglasses. This practical problem is experienced by people needing prescription glasses for other purposes as well, such as myopia. The purchase of a second pair of prescription glasses is expensive and involves the further practical problem of carrying around an additional pair of prescription lenses (i.e., the prescription sunglasses). The present invention addresses this problem by providing a means for converting a pair of spectacles, such as sunglasses, safety glasses, sports goggles or eyeglasses, into corrective and/or magnifying lenses, or for altering the corrective and/or magnifying properties of a pair of eyeglasses.

Many attempts have been made at simplifying the spectacle needs of people who wear corrective lenses, whether they wear corrective lenses at all times or only on occasion for specific tasks. For example, one attempt to solve the problem of having to purchase and carry two pairs of prescription eyewear at the same time is to wear contact lenses. The contact lenses can be prescription lenses and thus the wearer need carry only a single pair of tinted eyewear for use as sunglasses or can wear safety glasses with contacts. However, many people have difficulty wearing contact lenses, and many of those who do wear contact lenses find them irritating at times, particularly in bright sunlight and windy weather. Additionally, many people find that contact lenses require substantial efforts to insert, remove, and clean.

Another alternative to carrying two or more pairs of spectacles has been to use a pair of prescription eyeglasses that are tinted in such a way that there is a minor tint when the ambient light is relatively low, and a more severe tint as the ambient light becomes brighter. This approach is disadvantageous, because such eyeglasses are relatively expensive and the tint of the lenses may change at times when it is not desirable for it to change.

Yet another attempt to resolve the need for two pairs of corrective eyewear is to use "clip-on" or "snap-in" tinted lenses in connection with a pair of clear prescription eyeglasses. Clip-on lenses may be attached to a pair of eyeglasses by a clip, typically located at the center of the clip-on lenses. The clip may attach over the nosepiece of the eyeglasses. Sometimes the clip snaps over the sides of each of a pair of separate lenses formed to the shape of specific eyeglasses for which they are provided. In another variation, a tinted lens is snapped into a circumferential groove inboard of the clear lens. And in yet another attempt to solve the problem, clear prescription lenses are hung, hinged or otherwise detachably mounted inboard of a pair of conventional sunglass lenses. Typically, some additional structure, is added to the sunglass frames for holding a prescription lens or pair of lenses behind the sunglass lenses. In one species, the frames themselves are modified with threads to receive a "screwed-in" prescription lens for each lens of the sunglasses.

Despite these various efforts to develop a functional and comfortable "clip-on" lens, clip-on lenses can be disadvantageous because they result in less than desirable optics, typically through an inability to control the spacing and angular relationship between the sunglass lens and its clear lens with any precision or degree of stability, are heavy and tend to cause the eyeglasses to slip, and because they are often cosmetically unattractive.

Additional efforts have been made to resolve the issues presented when more than a single pair of spectacles is required for particular circumstances, or as circumstances change. Recently, 3M Company has provided on die cut sheets small "half-lens" shaped magnifiers cut from relatively flat vinyl stock and which employ a molded in Fresnel type grating for an optical magnification effect. These 3M lenses suffer from optical aberrations and poor performance, especially when adhered to the panes of a pair of spectacles. In addition, the magnifying power of the Fresnel material does not adapt well to bending and is not readily adaptable to prescription configurations.

Efforts have also been made to resolve the problems associated with adapting a pair of spectacles to correct a person's vision. For example, U.S. Pat. No. 3,628,854 of Jampolsky, dated Dec. 21, 1971, for "FLEXIBLE FRESNEL REFRACTING MEMBRANE ADHERED TO OPHTHALMIC LENS" (hereinafter "Jampolsky '854 patent"), and U.S. Pat. No. 4,079,160 to Philipson, dated Mar. 14, 1978 and entitled "ABRASION-RESISTANT OPTICAL ELEMENT" (hereinafter "Philipson '160 patent") attempt to address these issues. Whereas the first of these references recognized the fact that certain polymers possess autogenous adhesive properties which enable membranes thereof to be stuck by mere finger pressure to the surface of an optical lens, it did not contemplate lenses which are injection molded from self-adherent polymeric material and which are characterized by truly optical corrective or enlargement properties, so that a magnifying or reader-type set of eyeglasses, or a set of eyeglasses embodying corrective lenses, could be produced by the simple pressed-on adherence of the lens to the surface of a sunglass lens or other simple plano lens having no correction itself, to provide simply and expediently, a set of "reader" glasses or glasses comprising corrective lens elements in a most facile and economic manner. The polymeric membrane described in the Jampolsky '854 patent is of vinyl butyrate, of which thicknesses in excess of one-sixteenth of an inch are not recommended, and the most significant disclosure of this patent is clearly the presence of a Fresnel refracting surface which refracts light rays transmitted through an ophthalmic lens and the membrane of Jampolsky to the eye, in a manner enabling diagnosis and treatment of a disorder of the eye.

The Philipson '160 patent, although employing an aliphatic polyurethane, among many different polymeric substrates which are disclosed as being utilizable for the production of a hard abrasion-resistant coating on optical surfaces, as present in a pair of eyeglasses or sunglasses, did not contemplate or suggest the production of a press-on lens having truly optical or magnification characteristics from such type of polymer or any other. The Philipson patent thus relates to a hard protective lens coating.

In addition to the foregoing, U.S. Pat. No. 3,033,359 to Mercer discloses the employment of SARAN™ for temporarily attaching shields to optical lenses by electrostatic attraction; U.S. Pat. No. 4,898,459 to Eriksson discloses releasably attaching opaque films to reading spectacles; U.S. Pat. No. 2,248,638 to Merton discloses sheet material having prismatic surfaces; U.S. Pat No. 2,511,329 to Craig discloses a lens shield adhered to a lens by adhesive on one side of a thin flexible transparent sheet material (which is a drawback because adhesive affects the refraction of light penetrating the lens and lens shield); U.S. Pat. No. 2,884,833 to Pohl discloses an optical system for viewing pictures; U.S. Pat. No. 3,004,470 to Rühle discloses a multiple focal lens; U.S. Pat. No. 3,203,306 to Lefferts discloses an optical ray concentrator; French Patent 369,993 relates to protective goggles; published British Specification 717,775 relates to colored viewers with areas of different colors so that an object viewed appears to be colored; and Swiss Patent 207,794 relates to a protective screen for eyeglasses and the like.

There is a need for a simple, inexpensive corrective lens that may be used in connection with a pair of spectacles to provide a simple magnified or corrective pair of sunglasses, or to modify the correction of a pair of eyeglasses, that can be used comfortably and effectively for sustained periods of time. Thus, there is a need to adapt non-corrective sunglasses for use as corrective sunglasses, and to adapt corrective eyeglasses as needed for specific tasks, without the above noted disadvantages. The present invention provides these and other advantages.

SUMMARY OF THE INVENTION

As used herein, the terms "spectacles", "eyeglasses" and "glasses" are used interchangeable and refer to any type of corrective, protective or non-corrective eyewear, including but not limited to prescription and non-prescription eyeglasses, sunglasses, athletic goggles and protective goggles for scientific, medical or industrial use.

As used herein, the term "corrective" or "correction", or the like may be used to describe either simple magnification (diopter) or prescription correction (i.e., diopter, cylinder, and astigmatism) or both.

The present invention provides a magnifying or otherwise corrective lens which is injection molded from an elastomeric material such as aliphatic, thermoplastic polyurethane and, which is adapted to adhere to the lens of a pair of spectacles (the "base lens"), such as a normal sunglass or other plano lens, thus to be permanently but releasably secured thereto by virtue of the inherent, autogenous, or self-contained molecular surface adhesion properties of the lens, thereby providing magnifying or corrective lenses and spectacles embodying the same, with a minimum of inconvenience and maximized economy.

In one embodiment, the present invention is directed to a surface adherent lens for providing optical correction to a pane of a pair of spectacles. The lens is removably adherent to the pane and substantially in contact with a rear surface of the pane. The lens is comprised of at least one curved surface, and made of a material having a refractive index such that the curved surface and the refractive index cooperatively produce a nominal magnifying power.

In a second embodiment of the present invention, the lens is comprised of two curved surfaces, both surfaces being concave, having all of the additional properties of the present invention.

In a third embodiment of the present invention, the lens is comprised of two curved surfaces, a concave surface and a convex surface, having all of the additional properties of the first embodiment.

In yet another embodiment of the present invention, the lens is comprised of a convex surface and a non-concave surface, having all of the additional properties of the first embodiment.

In yet another embodiment of the present invention, the lens is comprised of two curved surfaces wherein the curved surfaces are aspheric, having all of the additional properties of the present invention.

In another aspect, the present invention is directed to a pair of spectacles comprising a corrective or magnifying lens removably adhered to each pane of the spectacles, wherein the lens is substantially in contact with a rear surface of each pane, and the lens is comprised of at least one curved surface and of a material having a refractive index such that the curved surface and the refractive index cooperatively produce a nominal magnifying power or correct the vision of the wearer.

The present invention is also directed to a method of producing cosmetically appealing eyewear. The method comprises molding a flexible lens to have at least one curved surface, and adhering the lens to at least one pane of a pair of spectacles by deforming the lens to bring it substantially into contact with a rear surface of the pane.

The present invention is also directed to a method of producing cosmetically appealing eyewear, wherein the method comprises molding a flexible lens and adhering the lens to a pane of a pair of spectacles by bringing the lens substantially into contact with the rear surface of the pane.

The invention, then, comprises the following, inter alia, singly or in combination:

A magnifying or corrective injection-molded elastomeric lens, comprising built-in magnifying or corrective optical characteristics and adapted to be securely but releasably secured to the surface of a sunglass or plano base lens by inherent molecular surface adhesion characteristics of the molded elastomeric lens itself; a plano or sunglass base lens comprising adhered to the surface thereof such an injection-molded elastomeric lens; and, eyeglasses comprising a frame incorporating therein at least one such a lens.

Also, such an optical lens of molded elastomeric material made from an aliphatic thermoplastic polyurethane; such an optical lens of molded polyurethane made from an aliphatic diisocyanate and an aliphatic polyol; such an optical lens wherein the diisocyanate comprises a cycloaliphatic diisocyanate; such an optical lens wherein the polyol comprises a diol or a mixture of a diol and a polyol having more than two hydroxyl groups; such an optical lens wherein the diisocyanate comprises dodecahydro-MDI or dodecahydro-diphenylmethylene-p,p'-diisocyanate; and a plano or sunglass base lens comprising adhered to the surface thereof an injection-molded aliphatic polyurethane lens; and such a plano or sunglass base lens comprising adhered to the surface thereof an injection-molded aliphatic polyurethane lens in place in a spectacle frame.

Moreover, such a polyurethane lens which comprises a plurality of magnifying or corrective segments combined in an integral or unitary lens and a base lens comprising the same adhered thereto; such a lens, wherein the base lens comprises a plurality of magnifying or corrective polyurethane lenses, at least one on each surface of said base lens; such a lens, wherein the base lens comprises a plurality of magnifying or corrective polyurethane lenses on the same surface of said base lens; such a lens, wherein the base lens comprises a plurality of magnifying or corrective polyurethane lenses on the same surface of said base lens and in contiguous relationship to each other; and such a lens, wherein the base lens comprises on a surface thereof a plurality of magnifying or corrective polyurethane lens segments combined in an integral or unitary lens.

OBJECTS OF THE INVENTION

Accordingly, a general object of the present invention is to avoid or substantially alleviate the problems noted in the Background of the Invention, above.

A more specific object of this invention is to provide ready-to-wear sunglasses which can be readily modified to fit the occasional magnified reading needs of some wearers, and the prescription needs of other wearers.

Yet another object of this invention is to provide ready-to-wear lenses which can be readily used to modify the magnification and/or corrective powers of a pair of spectacles, whether the spectacles be sunglasses, eyeglasses, athletic goggles or protective goggles for industrial, medical or scientific use, to accommodate the needs of the wearer.

It is yet another object of the present invention to provide self-stick or press-on lenses adapted to be securely but releasably secured to a surface of a base sunglass lens or plano lens by inherent molecular surface adhesion between the lens of the invention and the base sunglass or plano lens to which affixed and which are characterized by built-in or inherent magnifying and/or corrective characteristics, so that a pair of reader or corrective eyeglasses can readily be prepared by adhering one or more lenses of the present invention to one or more surfaces of the base sunglass and/or plano lenses originally present therein.

It is a further object of the present invention to provide in a simple, facile, and economical manner various types of composite magnifying or optically-corrective lenses utilizing the lenses provided by the present invention by adhering them to base plano and/or sunglass lenses in the manner set forth.

It is another object of the present invention to provide such lenses of the present invention from aliphatic thermoplastic polyurethanes.

A still further object of the present invention is to provide lenses according to the present invention which are injection-molded and which possess excellent optical clarity as well as the necessary autogenous or inherent molecular surface adhesion characteristics.

Additional objects will become apparent hereinafter and still further objects of the invention will be readily apparent to one skilled in the art to which this invention appertains.

THE DRAWINGS

Reference is now made to the drawings for a better understanding of the invention, wherein:

FIG. 1 depicts a pair of eyeglasses with typical base sunglass or plano lenses comprising, attached to the inner surfaces of each of the base lenses thereof by inherent molecular surface adhesion, a reader or magnifier lens of the present invention providing a 1 to 4 diopter magnification enhancement.

FIG. 2 depicts a partial eyeglass frame having a plano or sunglass base lens mounted therein and attached thereto, on the inner surface thereof by inherent molecular surface adhesion, a rounded bifocal bottom lens according to the present invention having a correction, representatively of +2 diopters. A further and separate lens according to the present invention is shown contiguous thereto secured by molecular surface adhesion to the upper part of the base lens, this lens unit or element representatively having a −1 diopter minification.

FIG. 3 depicts a normal plano or sunglass base lens having an essentially circular lens of the present invention attached thereto on the inside surface thereof by inherent molecular surface adhesion, the said essentially circular lens being designed for the correction of myopia or nearsightedness and having representatively a −2 diopter correction.

FIG. 4 shows another plano or sunglass base lens having a reader or magnifier lens according to the present invention attached to a surface thereof at the bottom thereof by inherent molecular surface adhesion and having representatively a +2.5 diopter magnification. Above the bottom lens is a second power lens according to the invention, integrally molded together with said first lens and representatively a +1.25 diopter magnification lens, whereas the upper portion of the base lens remains in its original form for adequate distance viewing.

FIG. 5 shows a more complex integral lens, wherein the base sunglass or plano lens has an integral lens of the invention comprising three (3) corrective lens segments adhered to the inner surface thereof by inherent molecular surface adhesion, the lower lens segment having a bifocal or reader correction of representatively +3.75, the second segment having a meso or intermediate correction of representatively +2.37 diopters, and the upper lens segment having a long range or distance correction of +1 diopter.

FIGS. 9a and 9b are further schematic side views of the adherent lens of the present invention.

FIG. 10a is a schematic side view of typical lens geometry of the invention.

FIG. 10b is a schematic rear view of typical lens geometry of the invention.

DETAILED DESCRIPTION OF THE PREFERRED EMBODIMENT

Figure 1:
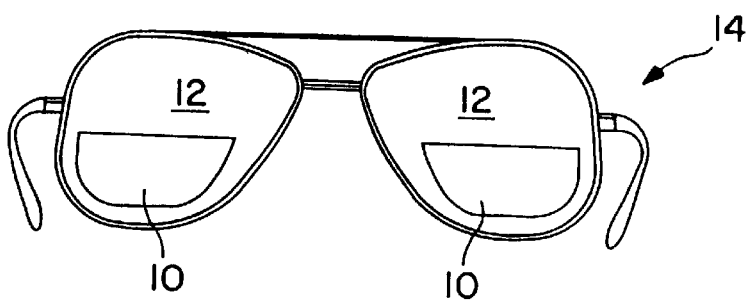

The present invention provides devices and methods for the adaptation of panes in spectacles, such as tinted lenses found in sunglasses, to be corrective, and therefore suitable for use by a person having need for optical magnification or for optical correction, such as by prescription lenses. By means of the invention, such a person may temporarily and removably convert inexpensive, non-corrective sunglasses, to "generic" magnifying sunglasses or high optical quality prescription sunglasses, depending on the type of inventive lens employed, in a simple and inexpensive manner.

The lens of the present invention is a stick-on or press-on lens which is injection molded from an elastomeric material such as aliphatic thermoplastic polyurethane, and which is characterized by magnifying or optically-corrective properties per se, that is, in itself, and which is adapted to be stuck on a normal sunglass or other plano lens, thus to be permanently but releasably secured thereto by virtue of its inherent, autogenous, or self-contained molecular surface adhesion properties, and thus to provide magnifying or corrective lenses and eyeglasses embodying the same directly and with a minimum of inconvenience and maximized economy.

Materials of Construction

Materials of construction, of the lenses of the invention having the built-in magnification or corrective characteristics and also characterized by molecular surface adhesion characteristics whereby they may be readily and securely but releasably secured to a surface of a plano or sunglass lens by molecular surface adhesion characteristics, are elastomeric materials, such as aliphatic thermoplastic polyurethanes, which are provided in granular or powder form and which are injection molded according to normal injection-molding procedure in normal injection molding apparatus using variable mold cavities as further described hereinafter.

In a preferred embodiment, the adherent corrective lens of this invention is made from optical grade, elastomeric material, such as a flexible plastic, and is capable of conforming to a variety of shapes of lenses, including cylindrical, conical, spherical, irregular, and toroidal, or a combination of such surfaces. It is preferred that the plastic used to produce the adherent corrective lens be strong and durable, and thus useful for numerous applications and removals from a series of panes for spectacles. It is also preferred that the corrective lens be "water clear," but a small amount of tint may be tolerated.

The materials employed and identified as aliphatic thermoplastic polyurethanes may be polyether based or polyester based, and the MORTHANE line of polyether-based and polyester-based aliphatic thermoplastic polyurethanes are particularly suitable for the purposes of the present invention. These are obtained from Morton International, Inc., Seabrook, N.H., and include MORTHANE PE199-100, PE193-100, PE192-100, and PN3429-100, by way of illustration but not by way of limitation. These polymers are characterized by excellent resilience, good low temperature flexibility, and superior color stability, outstanding UV stability, and optical clarity. They are likewise particularly well-suited for injection molding. Their excellent resilience, toughness, abrasion resistance, and hydrolytic stability is noteworthy. Particularly valuable for purposes of the present invention is their superior optical clarity. Necessary melt temperatures can be selected by one skilled in the injection molding art, ranging from 390° F. for the polyester-based PN3429-100, to approximately 120–130° C. for PE192-100, approximately 110–120° C. for PE193-100, and 65–130° C. for PE199-100. The product specification and data sheets for these products, four (4) pages, can be obtained from the manufacturer, and are incorporated herein by reference.

By way of further information, aliphatic thermoplastic polyurethanes are polyurethane reaction products of an aliphatic diisocyanate and an aliphatic polyol. Essential to the operativeness of these polyurethane products is that they produce upon molding a clear see-through, non-haze, light-stable, injection-molded lens product of exceptional optical clarity, which incorporates all of the characteristics as provided in the mold surface, but which yet are sufficiently self-adhering because of their autogenous or inherent molecular surface adhesion characteristics.

As will be noted from the attachments, the polyurethane thermoplastics especially suited for employment as materials of construction of the lenses or optical elements according to the preferred embodiment of the present invention embody those isocyanate (NCO) components which are characteristically aliphatic. HYLENE W from DuPont, which is MDI or methylene diisocyanate having twelve (12) additional hydrogen atoms, therefore being characteristically aliphatic, namely, cycloaliphatic in nature, and similar diisocyanates, are especially suitable. For polyethers in the PE series, the active-hydrogen containing ingredient may be an approximately 1,000 molecular weight backbone polytetramethylene glycol, or a polyol mixture which comprises both a diol and a polyol having more than two (2) hydroxy groups, such as a glycol and a triol, e.g., glycerol or trimethylolpropane. Other normal and usual variations in the polyether component may be employed according to the skill of the art. As to the polyester series, an approximately 1,000 molecular weight polyester embodying a dibasic acid such as adipic or glycolic acid may be employed, the ester being made by esterifying the acid as with ethylene glycol. Polyethylene glycol or propylene glycol or polypropylene glycol may be employed, at least in part, so long as the molecular weight does not substantially exceed approximately 1,000 for the polyester employed.

As is conventional in the art, chain extenders may be employed and when employed are advantageously short-chain diols such as ethane diol, propane diol, butane diol, and the like, so long as the aliphatic nature of the polyurethane thermoplastic resulting from the combination of the active-hydrogen-containing component and the diisocyanate remains essentially aliphatic in nature. As already mentioned, a preferred isocyanate is HYLENE W from DuPont which has the technical name "dodecahydro-MDI"

or "dodecahydro-diphenylmethylene-p,p'-diisocyanate", which is in fact one of a variety of cycloaliphatic diisocyanates which may be advantageously employed in producing starting powders or granules of the aliphatic thermoplastic polyurethane which are employed for injection molding using suitable molds and mold cavities for production of lenses or optical elements according to the present. Other equivalent isocyanate and active-hydrogen-containing polyurethane-producing reactants can of course be employed so long as the essentially aliphatic thermoplastic polyurethane nature of the starting powders or granules is maintained.

In a preferred embodiment of the present invention, the lenses are molded from aliphatic polyurethane polyether elastomers (ATPUs). Preferred ATPU's for use in maling the lenses of the present invention include TEXIN DP7-3006 and ATPU-Developmental 12, both manufactured by Bayer Corporation, Polymers Division, 100 Bayer Road, Pittsburgh, Pa. 15205. Other ATPUs manufactured by Bayer Corporation and suitable for use in the present invention include TEXIN DP7-3004, TEXIN DP7-3005, TEXIN DP7-3007, and TEXIN DP7-3008.

The Base Lens

The base lens to which the corrective lens of the present invention is applied may be any plano lens, that is, a lens without any correction, with or without tint or coloration as is commonly provided to reduce the passage of light and especially UV light therethrough, herein referred to as a "sunglass lens" or "sunglasses lenses." Under certain circumstances, it is anticipated that the base lens to which the corrective lens of the present invention is applied may also be a lens with correction. Whether the base lens is perfectly flat or somewhat arcuate or curved is immaterial, inasmuch as the lenses of the present invention, being somewhat flexible or resilient, will accept and adhere to slight curvatures and, moreover, since any curvatures of base lenses which lenses of the invention will not accept by virtue of their flexibility or resilience can be provided in the lens itself by incorporation of such curvature in the mold cavity should such be desirable in a particular case.

Sunglasses for use with one preferred embodiment of the invention described herein are those eyewear having toric lenses and substantial wrap depth such as those described in U.S. Pat. No. 4,741,611 to Burns and U.S. Design Pat. No. 270,165 to Burns. These sport performance and fashion sunglasses are commercially available under the trademark GARGOYLES. The disclosures of these patents are hereby expressly incorporated herein by reference. One embodiment of the present invention is particularly useful with respect to these toric sunglasses with substantial wrap depth because it is difficult to make conventional prescription sunglasses having such wrap depth. The invention can also be used with other ready-to-wear sunglasses and with prescription eyeglasses or other types of spectacles.

The Lens of the Present Invention

The self-adhering lens of the present invention may provide any type of magnification, as in a "reader" lens, or any kind of a corrective lens, as for nearsightedness, farsightedness, or combinations thereof, for correction of myopia, hyperopia or presbyopia, astigmatism, or the like, whether molded separately in separate mold cavities or as a unitary or integral lens in a single mold cavity, as will be apparent to one skilled in the art.

According to the present invention, a lens of the type provided according to the present invention, when a reader or magnification type, may have for example a power of +1.0 d, 1.5 d, 2.0 d, 2.5 d, 3.0 d, 3.75 d, or even up to 4.0 d, the "d" standing for diopters, approximately +2.5 d being usual and generally satisfactory for incorporation into a reader-type lens by attachment of a lens of the invention to the inner surface of a sunglass lens or a plano lens.

According to the present invention, there is no problem in making adjustments or changes in correction of a lens according to the present invention from lens to lens, or from eye to eye, it being entirely possible by simple redesign of the lens surfaces, as is now current practice in normal optical lens production. In the present case, it is only necessary to alter the mold surface, for example to provide a lower reader lens of between about +3.25 and +3.75 d, a +3.25 diopter being for example suitable for the right lens and +3.75 d for example being suitable for the left lens; with a meso or intermediate lens of +1.87 diopters for the right eye and a magnification of +2.37 diopters for the left eye, and with an upper lens portion being approximately a +0.50 or one-half diopter for both lenses, that is, for the lenses for both the left and the right eyes. For the meso correction, one-half of the total of the top and bottom corrections is generally acceptable, that is, if the correction in the upper portion of the lens is +0.5 or one-half diopter and in the lower portion of the lens is +2.75 diopters, then the total is +3.25 diopters, and the meso or intermediate power is generally about one-half of this amount or approximately +1.75 diopters. Such multi-power lenses may be provided as an integral unit or, if desired, in individual segments having 2 or 3 separate parts, as may be most convenient. When lenses of the type as provided by the present invention become widely commercially available, it is anticipated that different lens portions or segments may be provided separately, so that they may be combined on a base lens to produce a desired magnification or correction on either the right eye or the left eye or both for a particular party in need of a plurality of optical corrections.

The following examples are given by way of illustration only and are not to be construed as limiting. In a preferred embodiment of the present invention, the corrective lenses of the present invention are prepared by injection molding. A normal injection molding apparatus is provided whereby the polymer to be molded into a finished lens having polished surfaces corresponding to the surfaces of the mold cavity is introduced in a normal manner of the present invention. The feed portion of the apparatus is maintained at a preset temperature which is sufficient to melt the polymer employed during the course of its progress within the feed portion of the injection molding apparatus by the time it reaches the mold cavity itself. The polymer, which is fed to the injection molding apparatus in powder or granular form, is ordinarily metered into the apparatus from a funnel, in which it is thoroughly dried, whereafter the polymer is rammed by pressure, i.e., injected, into the mold cavity of the injection molding apparatus. The feed portion of the apparatus comprises the usual cylinder and corresponding plunger or screw which turns at a predetermined rate to progress or move the polymer powder or granules to the preset temperature and into a molten condition at the end of the feed and by the time it reaches the mold cavity. The mold cavity is chilled with circulating water. The mold is closed for approximately 18 seconds and thereafter opened, whereafter the lens as molded in the mold cavity falls out with an insignificant and hardly discernible parting line, thus providing a finished lens which may be replicated continuously and which incorporates all characteristics of the mold cavity, which appear on the surface of the finished lens or optical element, which has perfect optical clarity and excellent resilience, toughness, abrasion resistance, and hydrolytic stability. As already stated, each lens incorporates on the surfaces thereof all of the characteristics of the mold cavity, so that replicates may be produced rapidly and conveniently according to well-known and established injection molding technique of the type already employed for the production of camera lenses or even plastic eyeglasses themselves, which latter however are generally produced by grinding rather than by molding. Thus, the aliphatic thermoplastic polyurethane in granular or powder form, as previously described, is introduced in the manner fully set forth in the foregoing into the existing injection molding apparatus and in molten state into the die or mold cavity thereof having a predetermined polished surface and, after a suitable time in the mold cavity, expelled therefrom by opening the mold according to usual procedure. For further disclosure as to standard injection molding apparatus, practice, and technique, reference is made to "A CONCISE GUIDE TO PLASTICS" by Herbert R. Simonds, Reinhold Publishing Corporation, New York, N.Y., 1960 printing at pages 179–181 and Gudermuth, in Modern Plastics Encyclopedia, McGraw-Hill Inc., New York, N.Y., 1975–1976 Edition (Volume 52, Number 10A) at pages 331–348, the disclosure of which is hereby incorporated by reference.

Referring now to the drawings and the Figures thereof with greater particularity, the lens or optical element of FIG. 1 is a reader or magnifier lens 10 of 1 to 4 diopter magnification. The lens product of the invention, upon retrieval from the mold, is found to be of superior optical clarity and two such identical lenses are affixed in the manner indicated in FIG. 1 to the inner surfaces of the lenses 12 of a pair of plano sunglasses or a pair of uncolored plano glasses 14, thereby to provide readily, conveniently, and economically a pair of reader or magnification glasses, the reader lens 10 of the present invention adhering to the inner surface of the plano or sunglass base lens 12 by its inherent molecular surface adhesion characteristics and being removably secured thereto, i.e., securely affixed thereto by mere finger pressure alone and removable therefrom only with considerable effort as by the careful application of a prying tool such as a small screwdriver or fingernail along an edge thereof.

Figure 2:
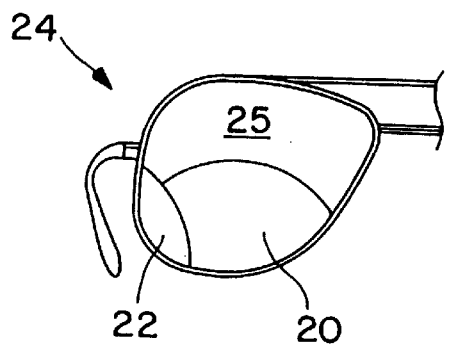

As shown in FIG. 2, the lens or optical element of the present invention is in the form of a rounded bifocal lens 20, having a correction say of +2 diopter, which is adhered to the surface of a sunglass or plano lens 22 in the same manner by finger pressure alone to provide a suitable bifocal corrective lens which, as shown in FIG. 2, can readily be inserted into the frame of a normal and usual pair of glasses 24. As also shown in FIG. 2, a further upper corrective lens 25 can also be provided by molding in a separate mold cavity a suitably sized and conformed lens having say a −1 diopter minification correction which can then be adhered in the same manner contiguously to lens 20 to the upper portion of the plano or sunglass lens 22.

Figure 3:
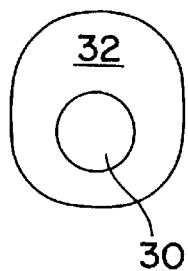

As shown in FIG. 3, a simple round or oval lens 30 can be provided in the same manner to correct nearsightedness or myopia, and in such case the lens correction will be of a minus (−) diopter in a power of, say −2 diopters. As shown, it is adhered by its inherent molecular surface adhesion characteristics to the inner or outer surface of plano or sunglass lens 32.

Figure 4:
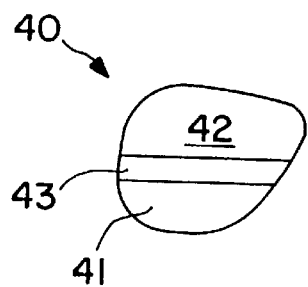

Referring now to FIG. 4, an integral lens 40 having two separate phases or powers is provided in the same manner by providing a mold cavity having the necessary conformation and dimensions and injection molding a selected aliphatic thermoplastic polyurethane therein according to previously-described procedure. In this manner a self-adhering lens 40 having a bottom portion 41 of say +2.5 diopters for a reader lens and an intermediate portion 43 having a power of say +1.25 diopters is readily provided and applied to the surface of a correspondingly contoured and dimensioned plano or sunglass lens 42 to produce the finished lens as shown in FIG. 4, the uppermost portion of which remains in its original and unaltered plano state.

Figure 5:
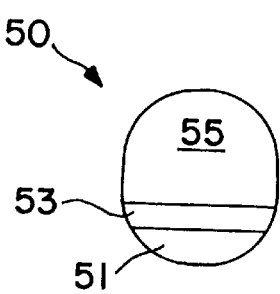

When a lens having three separate power segments is desired or required, this can be effected by providing a lens 50 of the type shown in FIG. 5, wherein the bifocal or reader lower portion 51 thereof has a correction say of +3.75 diopters, the meso or intermediate segment 53 has a correction of say +2.37 diopters, and the long range or distance correction segment 55 at the top thereof is of an approximately +1 diopter power. Upon adherence of the lens 50 according to the present invention to the inner surface of a standard correspondingly-sized plano or sunglass lens (not visible), a lens of the type shown in FIG. 5 is provided.

As to the lenses of FIGS. 4 and 5, it is of course quite possible, as already indicated, that the two segments 41 and 43 of the lens 40 of FIG. 4 and the three segments 51, 53, and 55 of the lens 50 of FIG. 5 can be molded in separate mold cavities and then individually but contiguously affixed to the inner surface of the plano or sunglass lens, as done for separate lens segments 20 and 25 in FIG. 2, to produce an effect which is identical to the effect produced by the unitary lenses or optical elements shown in FIGS. 4 and 5, although the individual segments of the lenses 40 and 50 in such case require individual or separate molds and molding.

Figure 6:
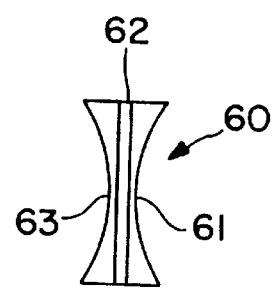
FIG. 6 is a cross-sectional view of a plano or sunglass base lens having attached thereto by inherent molecular surface adhesion two (2) separate lenses according to the present invention, one (1) on each side thereof, to correct astigmatism, the lenses having a twisted or rotated axis with relation to each other as is well known to be required for the correction of astigmatism.
Figure 7:
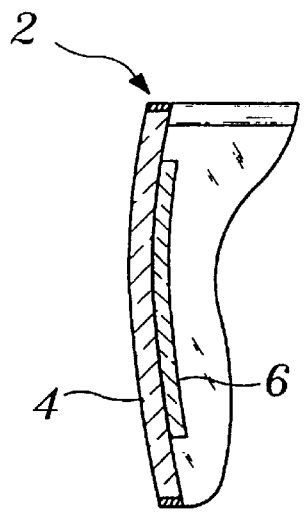
FIG. 7 is a schematic, representational side view of an adherent corrective lens that adheres to the inner surface of a pane of a pair of spectacles.

Although the corrective lens will typically be applied to the interior surface of the pane of the spectacles, as exemplified in FIG. 1 and FIG. 7, the corrective lens may also be designed so as to be applied to the exterior surface of the pane of the pair of spectacles. As shown in the cross-section of FIG. 6, it is even possible according to the present invention to provide a lens 60 comprising a plurality of lens elements of the invention for affixation to opposite sides of a plano or sunglass lens by inherent molecular surface adhesion characteristics of two separate lenses which, when twisted on their axes, can be employed to correct astigmatism and to provide for the astigmatic patient a focused correction simply by rotating or twisting the axes of the respective lens elements 61 and 63 on either side of the plano or sunglass lens 62 adequately and properly with respect to each other.

FIG. 7 depicts a cutaway side view of the adherent corrective lens 6 of the present invention applied to a pane 4 of a pair of spectacles 2.

Figure 8:
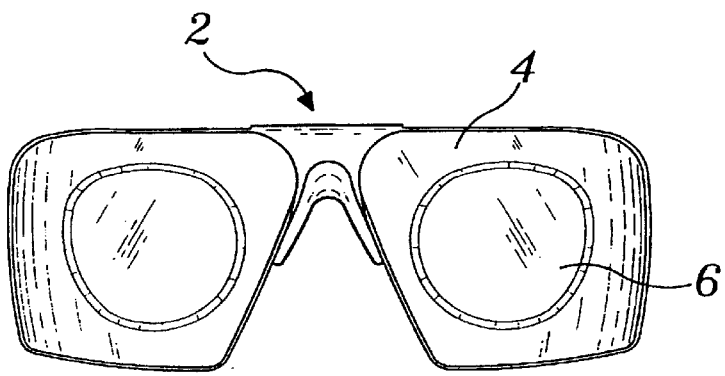
FIG. 8 is a rear view of a pair of spectacles having adherent corrective lenses that adhere to the panes of the pair of spectacles (the ear stems of the spectacles have been removed for clarity).

FIG. 8 depicts a rear view of the adherent corrective lens 6 adhered to an interior surface of a pane 4 of a pair of spectacles 2. The periphery of the corrective lens may be circular, oval, egg-shaped, aviator-lens shaped, or irregularly shaped. The periphery may likewise be adapted to fit a wide variety of spectacles, or adapted to closely conform to the peripheral edge of a pane of a specified pair of spectacles. For example, FIG. 1 depicts a rear view of an adherent corrective lens 10 having a half-moon shape and specifically adapted for use as a magnifier. As in FIG. 8, the adherent corrective lens 10 is adhered to the interior surface of a pane 12 of a pair of spectacles 14. In the embodiment depicted in FIG. 1, corrective lens 10 may be used similarly as a bifocal lens, and is therefore preferably positioned such that a wearer can easily alternate between viewing through the adherent corrective lens 10 or through the unmodified pane 12.

In a further aspect, as depicted in FIG. 8, the present invention provides a pair of spectacles comprising a corrective lens as described above securely adhered to each pane of the pair of spectacles without the use of any mechanical retention device. Typically, two corrective lens, whether for magnification or prescriptive correction, will be used with one lens applied to each of the two panes of a pair of sunglasses. However, a single corrective lens may also be adhered to a single pane of a pair of spectacles, or two or more corrective lenses may be used in combination, and applied to a single pane of a pair of spectacles.

In one embodiment, the magnifier lens of the invention is a plano convex lens, as shown in FIG. 9a, having, for achieving various diopter magnification powers, the curves and thicknesses as shown in Table 1, below:

TABLE 1

| Power  | C.T.   | R1      | R2    |
|--------|--------|---------|-------|
| 2.00 D | 0.035" | 10.435" | plano |
| 2.50 D | 0.035" | 8.351"  | plano |
| 3.00 D | 0.036" | 6.962"  | plano |

In Table 1, "power" refers to magnification power in diopters, "C.T." refers to thickness at the optical center of the lens, "R1" is the radius of the convex curve on the lens, and "R2" (which would typically be another curve radius in such a chart) is "plano" meaning no curve, or flat. In this embodiment an edge thickness of 0.032 inch is preferably maintained around the edge of the lens. The dimensions given above are for when the lens is separate from (that is, not adhered to) the pane of the eyewear; dimensions of the lens as adhered to the pane will vary slightly in accordance with bend and flex of the lens segment to accommodate the various curvatures of the panes to which the lens is to adhere. For instance, when the lens of the present invention is bent to conform to the curvature of the inner surface of a GARGOYLE brand lens, there is a small but not very significant amount of power introduced from such bending. In the 2.0 diopter configuration from Table 1, and adhered to a GARGOYLE brand lens, there is about −0.07 diopter introduced in the horizontal meridian, and zero diopter in the vertical, corresponding to a slight astigmatism (spherical equivalent of 0.03 diopter). For the 2.5 diopter and 3.0 diopter configurations in Table 1, this astigmatic bending error is 0.024 diopter and zero respectively in the horizontal meridian, and zero for both in the vertical meridian. In one embodiment of the invention, this magnifier lens is molded from an optical grade vinyl, and these numbers are calculated based on an average refractive index for vinyl taken from the midpoint (n=1.53) of vinyl refractive indices (ranging from 1.50–1.55) listed in the Handbook of Chemistry and Physics. These numbers can vary with the exact vinyl refractive index, or the refractive index of an alternative lens substance.

In FIGS. 9a and 9b typical adherence of plano convex lens 6 to pane 4, an alternative embodiment of the present invention, is illustrated. In FIG. 9a lens 6 is shown in proximity to pane 4 just prior to adherence. In FIG. 9b lens 6 has been pressed and adhered to pane 4, with the result that the (formerly flat) front surface of lens 6 is now substantially in contact with the rear surface of pane 4, and has conformed itself substantially to the same curvature. At the same time, the (formerly convex) curved rear surface of lens 6 has acquired a recurvature that will typically be flat to slightly concave. In this embodiment of the invention, the dimensions of the lens when separate from (that is, not adhered to) the pane of the eyewear will vary slightly from dimensions of the lens as adhered to the pane in accordance with bend and flex of the lens segment to accommodate the various curvatures of the panes to which the lens is to adhere. It is believed that this configuration and method of adherence results in optimum adherence properties with minimum optical and cosmetic aberrations, while substantially achieving the target magnification power.

Where it is considered that the flex required for the plano convex embodiment described above may be too severe, an optional embodiment is contemplated having a spherical meniscus lens with a front curve lying midway between that of the piano convex magnifier lens and the rear curves of the spectacle panes to which the lens is to adhere. Additionally, it is contemplated that the upper "straight" edge of the lens may be modified into a shallow curve convex upward to alleviate any perceived optical or cosmetic deficiency arising from less than exact horizontal line up of the two such lens segments on two panes of a pair of spectacles. It is anticipated that, should a slight horizontal misalignment occur, the relative tilt of the two segments would be relatively easy to see. With the contemplated upward curved modification, any misalignment will be less noticeable, and even have an improved cosmetic appearance.

Alternatively, the lens can be molded to have a forward (R1) surface that exactly, or at least substantially, matches the curves of the rear pane surfaces (R2) of the spectacles to which the lens is to adhere. This will be particularly advantageous when a prescription lens is desired for adhering in the manner of the invention to a pane or panes of a pair of spectacles. Tables 3, 4, and 5 below contain typical data and example calculations for determining the rear (R2) curvature (magnifier diopter only, not exact prescription calculations, the method of which will be known to those skilled in the art) in both horizontal and vertical meridians, given an R1 front curvature that matches an R2 rear curvature of a pane. Dimensions given in the tables below are in inches unless otherwise noted. In the examples below the curvatures are given for the rear (R2) curvatures of a GARGOYLES brand toric lens pane and are constrained to produce a uniform edge thickness. In this manner, prescription adherent lenses may be prescribed by ophthamological professionals, and then molded or ground from substances disclosed herein and then preferably removably adhered to the panes of the indicated spectacles in the manner disclosed herein.

In Tables 3, 4, and 5 below the variable values noted in the left columns of each calculation section have the meanings as indicated in Table 2, below:

TABLE 2

Definition of Variables:

| Fv | Target power at optical center of lens |
|---|---|
| Fv(R1, R2, t, n) | Power computed for specified values of R1, R2, t and n |
| R1 | Radius of curvature of first surface |
| R2 | Radius of curvature of second surface |
| t | Thickness at optical center |
| n | Index of refraction |
| R2(Fv, R1, t, n) | Radius of second surface required to produce target power |
| d | Distance from center (×2) for edge thickness calculation |
| S1 | Sagittal distance of first surface |
| S2 | Sagittal distance of second surface |
| t(e) | Edge thickness measured parallel to optical axis |
| t(c) | Caliper edge thickness. Approximation taken perpendicular to the first surface. |

These values in Table 2 above are graphically (typically) illustrated in FIG. 10, where R1 radius of curvature of forward surface is 11; R2 radius of curvature of rear surface is 12; t thickness at optical center is 13; d distance from optical center (X2) is 16; S1 sagittal distance of forward surface is 17; S2 sagittal distance of rear surface is 18; t(e) edge thickness measured parallel to optical axis is 14; and t(c) caliper edge thickness is 15.

TABLE 3

|  | Seg. power 2.0 D (R2 plano) | | Seg. power 2.0 D (R2cyl horiz. merid.) | | Seg. power 2.0 D (R2cyl vert. merid.) | |
| --- | --- | --- | --- | --- | --- | --- |
|  | Input | Calc. | Input | Calc. | Input | Calc. |
| Fv | 2.000 D |  | 2.000 D |  | 2.000 |  |
| Fv(R1, R2, t, n) |  | 2.000 D |  | 1.930 D |  | 2.000 D |
| R1 | 10.435 |  | 2.022 |  | 4.491 |  |
| R2 | 10000.000 |  | 2.469 |  | 7.848 |  |
| t (mm) | 0.88 mm |  | 0.88 mm |  | 0.88 mm |  |
| n | 1.530 |  | 1.530 |  | 1.630 |  |
| R2(Fv, R1, t, n) |  | 10818.740 |  | 2.490 |  | 7.848 |
| d | 0.490 |  | 0.490 |  | 0.490 |  |
| S1 |  | 0.003 |  | 0.015 |  | 0.007 |
| S2 |  | 0.000 |  | 0.012 |  | 0.004 |
| t(e) (mm) |  | 0.81 mm |  | 0.81 mm |  | 0.81 mm |
| t(c) (mm) |  | 0.81 mm |  | 0.81 mm |  | 0.81 mm |

TABLE 4

|  | Seg. power 2.5 D (R2 plano) | | Seg. power 2.5 D (R2cyl horiz. merid.) | | Seg. power 2.5 D (R2cyl vert. merid.) | |
| --- | --- | --- | --- | --- | --- | --- |
|  | Input | Calc. | Input | Calc. | Input | Calc. |
| Fv | 2.500 D |  | 2.500 |  | 2.600 |  |
| Fv(R1, R2, t, n) |  | 2.500 |  | 2.476 D |  | 2.000 D |
| R1 | 8.351 |  | 2.022 |  | 4.491 |  |
| R2 | 10000.000 |  | 2.639 |  | 7.848 |  |
| t (mm) | 0.90 mm |  | 0.90 mm |  | 0.88 mm |  |
| n | 1.530 |  | 1.530 |  | 1.530 |  |
| R2(Fv, R1, t, n) |  | 9022.178 |  | 2.647 |  | 9.666 |
| d | 0.490 |  | 0.490 |  | 0.490 |  |
| S1 |  | 0.004 |  | 0.015 |  | 0.007 |
| S2 |  | 0.000 |  | 0.011 |  | 0.004 |
| t(e) (mm) |  | 0.81 |  | 0.81 mm |  | 0.81 mm |
| t(c) (mm) |  | 0.81 |  | 0.81 mm |  | 0.81 mm |

TABLE 5

|  | Seg. power 3.0D (R2 plano) | | Seg. power 3.0D (R2cyl horiz. merid.) | | Seg. power 3.0D (R2cyl vert. merid.) | |
| --- | --- | --- | --- | --- | --- | --- |
|  | Input | Calc. | Input | Calc. | Input | Calc. |
| Fv | 3.000 D |  | 3.000 |  | 3.000 |  |
| Fv(R1, R2, t, n) |  | 3.000 |  | 3.000 D |  | 3.000 D |
| R1 | 6.962 |  | 2.022 |  | 4.491 |  |
| R2 | 10000.000 |  | 2.826 |  | 12.576 |  |
| t (mm) | 0.92 mm |  | 0.92 mm |  | 0.92 mm |  |
| n | 1.530 |  | 1.530 |  | 1.530 |  |
| R2(Fv, R1, t, n) |  | 8173.697 |  | 2.826 |  | 12.576 |
| d | 0.490 |  | 0.490 |  | 0.490 |  |
| S1 |  | 0.004 |  | 0.015 |  | 0.007 |
| S2 |  | 0.000 |  | 0.011 |  | 0.002 |
| t(e) (mm) |  | 0.81 |  | 0.81 mm |  | 0.81 mm |
| t(c) (mm) |  | 0.81 |  | 0.81 mm |  | 0.81 mm |

It is thus seen that novel and unique lenses or optical elements are provided by the present invention, which are injection molded of aliphatic thermoplastic polyurethane materials and therefore characterized by molecular surface adhesion characteristics which enable them to be pressed-on or stuck to the surface of a normal plano or sunglass lens and thus to be securely but releasably secured thereto, and which lenses, being molded, can be provided with almost any desired type of magnification and corrective characteristics, so as to provide a ready method and means of producing reader and corrective lenses for mounting in corresponding frames of usual type, but with corresponding facility and economy. The lenses of the invention may take various forms and shapes and configurations, as already pointed out, and may be readily and conveniently mounted on either surface of a flat or curved plano or sunglass lens as desired, in each case to provide a final composite lens having the desired characteristics of magnification or correction. The single or multi-power lenses of the invention, and the corresponding portion of composite lenses embodying the same, are characterized by excellent resilience, toughness, and abrasion resistance, and above all by superior optical clarity and excellent hydrolytic stability. Accordingly, all of the objectives of the present invention have thereby been attained.

The present embodiments of the present invention are to be considered in all respects as illustrative, but not restrictive. It is to be understood that the present invention is not to be limited to the exact details of operation, or to the exact compounds, compositions, methods, procedures, or embodiments shown and described, as various modifications and equivalents will be apparent to one skilled in the art, wherefore the present invention is to be limited only by the full scope which can be legally accorded to the appended claims.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A non-Fresnel elastomeric optical lens, comprising built-in magnifying or corrective optical characteristics and adapted to be securely but releasably secured to the surface of a base lens by inherent molecular surface adhesion characteristics of the elastomeric optical lens.

2. A base lens comprising adhered to the surface thereof the optical lens of claim 1.

3. Eyeglasses comprising a frame incorporating therein the base lens of claim 2.

4. The optical lens of claim 1, wherein the elastomeric optical lens is formed from an aliphatic thermoplastic polyurethane.

5. The optical lens of claim 4, wherein the aliphatic thermoplastic polyurethane is comprised of an aliphatic diisocyanate and an aliphatic polyol.

6. The optical lens of claim 5, wherein the diisocyanate comprises a cycloaliphatic diisocyanate.

7. The optical lens of claim 5, wherein the aliphatic polyol comprises a diol or a mixture of a diol and a polyol having more than two hydroxyl groups.

8. The optical lens of claim 5, wherein said diisocyanate comprises dodecahydro-MDI or dodecahydro-diphenylmethylene-p,p'-diisocyanate.

9. A base lens comprising adhered to the surface thereof an the optical lens of claim 5.

10. A base lens comprising adhered to the surface thereof an the optical lens of claim 6.

11. A base lens comprising adhered to the surface thereof an the optical lens of claim 7.

12. A base lens comprising adhered to the surface thereof an the optical lens of claim 8.

13. Eyeglasses comprising a frame incorporating therein the base lens of claim 5.

14. The optical lens of claim 1, wherein the optical lens comprises a plurality of magnifying or corrective segments combined in sequence in a single optical lens.

15. A base lens comprising adhered to the surface thereof the optical lens of claim 14.

16. A base lens comprising adhered to the surface thereof a plurality of the optical lenses of claim 1, wherein the optical lenses are adhered on the same surface of the base lens.

17. A base lens comprising adhered to the surface thereof a plurality of the optical lenses of claim 1, wherein the optical lenses are adhered on the same surface of the base lens and in contiguous relationship to each other.

18. A base lens comprising adhered to the surface thereof a plurality of the optical lenses of claim 1, wherein at least on of the optical lenses of claim 11 is adhered to each surface of the base lens.

19. A pair of eyeglasses comprising an aliphatic thermoplastic polyurethane optical lens removably adhered to at least one base lens of the pair of eyeglasses, the optical lens having a nominal magnifying power and comprised of clear elastomeric material, the optical lens being removably adherent to the rear surface of the base lens, the optical lens having, before it is adhered to the base lens, a non-Fresnel convex surface and a non-Fresnel non-concave surface, and comprising a corrective lens material having a refractive index such that the nominal magnifying power of the optical lens is produced solely by cooperation of the refractive index with the optical lens surfaces, and the lens material, having a flexibility such that the optical lens is conformable to a variety of shapes of the rear surface of the base lens; wherein the optical lens is removably adherent to the base lens through inherent tactile interactions and substantial contact between a surface of the optical lens and the rear surface of the base lens when the optical lens is pressed against the base lens.

20. The eyeglasses of claim 19 wherein the optical lens is a prescription lens.

21. A method of producing a cosmetically appealing pair of optically magnified eyeglasses comprising the steps of:

(1) forming a flexible optical lens to have a nominal magnifying power and a non-Fresnel convex surface and a non-Fresnel non-concave surface, wherein the optical lens is comprised of material having a refractive index such that the nominal magnifying power of the optical lens is produced solely by cooperation of the refractive index with the corrective lens surfaces;

(2) removably adhering the optical lens to a base lens of the pair of eyeglasses by pressing the optical lens to deform the optical lens and thereby bring the optical lens substantially into contact with a rear surface of the base lens to adhere the optical lens to the base lens through inherent tactile interactions.

22. The method of claim 21, further comprising removing the optical lens from the base lens and then applying the optical lens to a base lens of a second pair of eyeglasses.

23. An optical lens having a nominal magnifying power and comprised of clear elastomeric material, the optical lens removably adherent to a rear surface of a base lens of a pair of eyeglasses, the optical lens having, before it is adhered to the base lens, a non-Fresnel convex surface and a non- Fresnel non-concave surface, and comprising a lens material having a refractive index such that the nominal magnifying power of the optical lens is produced solely by cooperation of the refractive index with the optical lens surfaces, and the optical lens material having a flexibility such that the optical lens is conformable to a variety of shapes of the rear surface of the base lens; wherein the optical lens is removably adherent to the base lens through inherent tactile interactions and substantial contact between a surface of the optical lens and the rear surface of the base lens when the optical lens is pressed against the base lens.

24. The optical lens of claim 23 where the optical lens has a front curved surface and a rear curved surface, and the surfaces are molded to produce a prescription optical correction.

25. The optical lens of claim 24 wherein the optical lens is made of a flexible plastic having a front curved surface substantially corresponding to the rear surface shape of the base lens of the pair of eyeglasses.

26. The optical lens of claim 23, wherein a front surface of the optical lens is flat, the flat surface being deformed to the shape of the rear surface of the base lens as the optical lens is brought substantially into contact with the rear surface.

27. The optical lens of claim 23 wherein the difference between the nominal magnifying power of the optical lens after it is adhered to the base lens, and the nominal magnifying power of the optical lens before it is adhered to the base lens, is not significant.

* * * * *

UNITED STATES PATENT AND TRADEMARK OFFICE
CERTIFICATE OF CORRECTION

PATENT NO.    : 6,170,952 B1
DATED         : January 9, 2001
INVENTOR(S)   : P.G. La Haye et al.

It is certified that error appears in the above-identified patent and that said Letters Patent is hereby corrected as shown below:

<u>Item [73]</u>
Assignee, "Neoptx, Inc., " should read -- Neoptx Inc., --

<u>Item [57]</u>
Abstract, Line 3, delete the first occurrence of "of a"

<u>Column 1,</u>
Line 24, "properties," should read -- properties; --

<u>Column 2,</u>
Line 28, "structure," should read -- structure --

<u>Column 3,</u>
"interchangeable" should read -- interchangeably --

<u>Column 4,</u>
Line 6, "and," should read -- and --

<u>Column 7,</u>
Line 46, "construction," should read -- construction --

<u>Column 9,</u>
Line 7, "present." should read -- present invention. --
Line 15, "ATPU's" should read -- ATPUs --
Line q5, "maling" should read -- making --

<u>Column 17,</u>
Line 65, "an the" should read -- the --
Line 67, "an the" should read -- the --

<u>Column 18,</u>
Line 2, "an the" should read -- the --
Line 4, "an the" should read -- the --
Line 22, "on of the" should read -- one of the --
Line 43, "claim 19" should read -- claim 19, --
Line 53, "surfaces;" should read -- surfaces; and --

UNITED STATES PATENT AND TRADEMARK OFFICE
CERTIFICATE OF CORRECTION

PATENT NO.   : 6,170,952 B1
DATED        : January 9, 2001
INVENTOR(S)  : P.G. La Haye et al.

It is certified that error appears in the above-identified patent and that said Letters Patent is hereby corrected as shown below:

<u>Column 19,</u>
Line 12, "claim 23" should read -- claim 23, --

<u>Column 20,</u>
Line 1, "claim 24" should read -- claim 24, --
Line 9, "claim 23" should read -- claim 23, --

Signed and Sealed this

Twenty-first Day of August, 2001

*Attest:*

*Nicholas P. Godici*

*Attesting Officer*

NICHOLAS P. GODICI
*Acting Director of the United States Patent and Trademark Office*